United States Patent Office 2,780,621
Patented Feb. 5, 1957

2,780,621

SIDE CHAIN DEGRADATION OF 11-KETO STEROIDS

Donald Reinhold, New Brunswick, N. J., assignor to Merck & Co., Inc., Rahway, N. J., a corporation of New Jersey No Drawing. Application June 30, 1953,
Serial No. 365,225

30 Claims. (Cl. 260—239.55)

This invention pertains in general to the preparation of 11,20-diketo-cyclopentanopolyhydrophenanthrene compounds, and more particularly to a novel process for the production of such compounds from an 11-keto-cyclopentanopolyhydrophenanthrene compound having an unsaturated steroid side chain.

In the synthesis of cortisone from sterols, such as ergosterol and stigmasterol, the characteristic side chain, which is attached to ring D of the steroid nucleus and which has the following structural formula:

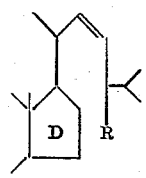

wherein R is methyl or ethyl, is ordinarily degraded to the two carbon pregnane side chain after the introduction into the steroid nucleus of the C–11 ketone substituent. Degradation methods heretofore advocated have involved the transformation of the unsaturated ergostene or stigmastene side chain to a bisnorallocholanic acid; reaction of this acid with a Grignard reagent; dehydration of the resulting carbinol, and oxidation of the consequent 11-keto-bisnorallocholene compound. This type of process necessitated the use of expensive reagents, long reaction times and difficult isolation procedures.

These objectionable features are substantially avoided by the method embodying the invention, which can be successfully employed with 11-keto steroids as starting materials. In this method the double bond of the steroid side chain is ozinized, and the resulting ozonide is decomposed under reductive conditions to form a bisnorcholanyl aldehyde, which is then subjected to side chain enol acylation with a suitable reagent and catalyst, after which the enol acylate is ozonized and decomposed under reductive conditions to yield the desired 11,20-diketo-cyclopentanopolyhydrophenanthrene compound.

An important inventive feature of the improved process is the selective character of the enol acylation of the side chain in the bisnor aldehyde without material acylation of the C–11 substituent. It has been found that when the catalysts normally employed in the acylation, such as p-toluene sulfonic acid, methane sulfonic acid and sulfuric acid, are used, the undesired acylation will occur in ring C. This is avoided in accordance with the invention, by employing a catalyst in the selective enol acylation of the steroid side chain which has the same acid radical as the acylation reagent.

The latter reagent is advantageously an acid anhydride of a lower carboxylic acid, and the catalyst is an alkali metal salt, preferably the sodium salt, of the same acid. More specifically, it has been found advantageous to employ acetic anhydride as the reagent, and sodium acetate as the catalyst.

In the process embodying the invention the starting material, a $\Delta^{22}$-cyclopentanopolyhydrophenanthrene-11-one compound, is reacted with ozone to produce the corresponding cyclopentanopolyhydrophenanthrene-11-one-22,-23-ozonide, which is then decomposed under reductive conditions to form the corresponding cyclopentanopolyhydrophenanthrene-11-one-22-al, which may also be referred to as a bisnorcholan-11-one-22-al compound.

This bisnorcholan-11-one-22-al compound is then selectively enol acylated, using a suitable reagent together with a catalyst that has the same acid radical as the reagent, thereby acylating the C–17 side chain without material acylation of the 11-keto substituent, thereby producing the corresponding enol acylate, the $\Delta^{20(22)}$-pisnorcholene-22-ol-11-one acylate compound, and more particularly such an enol acylate having an acyloxy substituent at C–3 with the same acyl radical as that attached to the C–17 side chain. When said bisnorcholan-22-al-11-one compound has a hydroxy substituent at C–3, this substituent will also be acylated during acylation of the aldehyde side chain, with the resultant formation of the corresponding $\Delta^{20(22)}$-bisnorcholene-3,22-diol-11-one-3,22-diacylate.

The acylated product is ozonized to form the corresponding bisnorcholan-22-ol-11-one 20,22-ozonide acylate such as bisnorcholan-3,22-diol-3,22-diol-11-one 20,22-ozonide acylate. The latter ozonide is then decomposed under reductive conditions to form the corresponding cyclopentanopolyhydrophenanthrene - 11,20 - dione compound, more particularly, the corresponding pregnane-11,20-dione compound.

The process embodying the invention will now be described more in detail. The starting material, a $\Delta^{22}$-11-keto-cyclopentanopolyhydrophenanthrene compound, which may have a functional substituent at C–3, may be obtained in known manner, as described in J. A. C. S. 73, 2396 (1951). The substituent at C–3 may be a free hydroxyl group, but preferably is acylated to an acyloxy substituent, which advantageously is an acetoxy derivative; but other esters, such as the propionate, butyrate or benzoate, may be used. More particularly, the starting material may be a $\Delta^{22}$-ergostene-11-one compound, as for example, a $\Delta^{22}$-ergostene-3-ol-11-one-acylate such as $\Delta^{22}$-ergostene-3-ol-11-one - alkanoate, $\Delta^{22}$-ergostene - 3-ol-11-one-acetate, $\Delta^{22}$-ergostene- 3 -ol- 11 -one-propionate, $\Delta^{22}$-ergostene-3-ol-11-one-butyrate, $\Delta^{22}$-ergostene-3-ol-11-one-benzoate, or $\Delta^{22}$-ergostene-3-ol-11-one, a $\Delta^{22}$-stigmastene-11-one compound, as for example, $\Delta^{22}$-stigmastene-3-ol-11-one acylate, such as a $\Delta^{22}$-stigmastene-3-ol-11-one-alkanoate, specifically $\Delta^{22}$-stigmastene-3-ol-11-one-acetate, $\Delta^{22}$-stigmastene-3-ol-11-one-propionate, $\Delta^{22}$-stigmastene-3-ol-11-one - butyrate, $\Delta^{22}$-stigmastene-3-ol-11-one-benzoate, or $\Delta^{22}$-stigmastene-3-ol-11-one, and the like.

The process will be described for illustrative purposes as applied to the production of allopregnane-11,20-dione compounds starting with the corresponding $\Delta^{22}$-ergostene-11-one compound; the reactions involved in this process may be chemically represented, insofar as the changes taking place in the radicals attached to rings C and D are concerned, as follows:

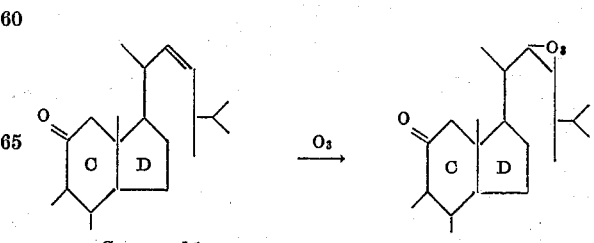

Compound 1    Compound 2

$CH_3COOH/Zn$

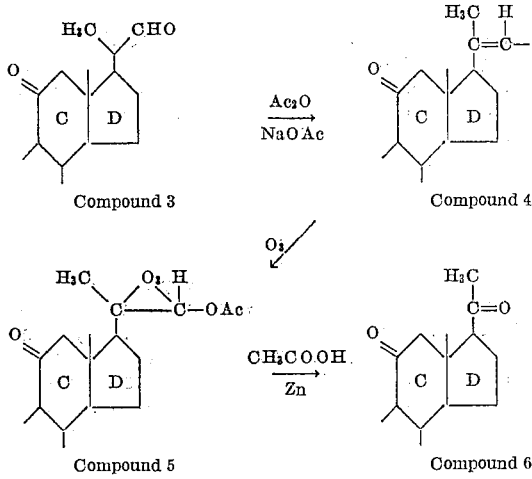

The starting material, a $\Delta^{22}$-ergostene-11-one compound (compound 1), preferably $\Delta^{22}$-ergostene-3-ol-11-one-acetate is ozonized by passing a stream of ozonized oxygen through a solution of said sterol in an organic solvent at temperatures ranging from about $-70°$ C. to about room temperature. Solvents such as methylene chloride, ethylene chloride, acetic acid, ethyl acetate and chloroform may be employed. For instance, the step has been carried out satisfactorily with the indicated ergostene derivative in a methylene chloride solution at about $-60°$ C., and also in an acetic acid solution at about room temperature. In all cases, ozone slightly in excess of one molecular equivalent is charged to the reaction solution, preferably between 1.0 and 1.2 equivalents being used.

The ergostane-11-one-22,23-ozonide (compound 2) produced in this manner is decomposed under reductive conditions in such a way as to obtain maximum yields of the aldehyde, as for example, with zinc and acetic acid, or with sodium iodide and acetone. In the preferred method any low-boiling solvent is replaced with acetic acid, followed by the addition of excess zinc dust. The reaction mixture is then stirred at about room temperature for one-half to two hours, the zinc removed by filtration, and the corresponding 11-keto-bismorallocholan-22-al-11-one compound (compound 3) is isolated by conventional means.

When other starting compounds are used as indicated hereinabove, the described ozonization and reduction will of course produce the corresponding bisnorallocholan-22-al-11-one compounds. These products are novel; and they constitute, together with the method of producing them, features of the invention. These bisnorallocholan-22-al-11-one compounds include bisnorallocholan-22-al-3-ol-11-one - acylate, bisnorallocholan-22-al-3-ol-11-one-alkanoate, specifically bisnorallocholan-22-al-3-ol-11-one-acetate, bisnorallocholan-22-al-3-ol-11-one-butyrate, bisnorallocholan-22-al-3-ol-11-one-benzoate and bisnorallocholan-22-al-3-ol-11-one, and the like.

In the illustrative process, the bisnorallocholan-22-al-11-one compound (compound 3), specifically bisnorallocholan-22-al-3-ol-11-one-acetate is selectively enol acylated, as by reaction with an acid anhydride, preferably acetic anhydride, in the presence of a catalyst. In order to avoid the possibility of ester interchange, nuclear hydroxyl groups should be protected with the same acyloxy radical as that present in the catalyst that is used to form the enol acylate. Since there are two enolizable functions, namely the C-11 ketone and the C-22 carbonyl group, as already noted, an alkali metal salt of the acid corresponding to the anhydride reagent is used as the catalyst, acetic anhydride as the reagent and sodium acetate as the catalyst being preferred; but other lower alkanoic anhydrides such as propionic, butyric and benzoic anhydrides may be employed as reagents together with the sodium or potassium salt of the same acid as catalyst.

When other starting materials already enumerated are employed, the enol acylate thus obtained is the corresponding 22-acylate of the $\Delta^{20(22)}$-bisnorcholene-11-one compound (compound 4), as for example, a $\Delta^{20(22)}$-bisnorallocholene-3,22-diol-11-one-3,22-diacylate, such as $\Delta^{20(22)}$-bisnorallocholene - 3,22 - diol - 11-one-3,22-dialkanoate, $\Delta^{20(22)}$-bisnorallocholene - 3,22-diol-11-one-3,22-dipropionate, $\Delta^{20(22)}$-bisnorallocholene - 3,22-diol-11-one-3,22-dibutyrate, $\Delta^{20(22)}$-bisnorallocholene - 3,22 - diol-11-one-3,22-dibenzoate, and the like.

The $\Delta^{20(22)}$-11-keto-22-acyloxy-bisnorallocholene compound (compound 4) which in the illustrative operation is $\Delta^{20(22)}$-bisnorallocholene - 3,22-diol-11-one-3,22-diacylate, is isolated by standard methods, which may include removal of the acylating reagent, dissolution in suitable solvents and crystallization.

The final state, including the steps of ozonization of the $\Delta^{20(22)}$-bisnorallocholene - 22 - ol - 11-one-22-acylate compound (compound 4) to form the corresponding bisnorallocholan - 22 - ol - 11-one-20,22-ozonide-22-acylate (compound 5) and decomposition of said ozonide is carried out in substantially the same manner as the first ozonization and decomposition steps previously described. The resulting allopregnane compound (compound 6) is isolated in substantially pure condition, as by extraction with an organic solvent, removal of the solvent, and recrystallization from a suitable solvent such as methanol or petroleum ether.

The process embodying the invention also results in the production of new compounds; and these compounds, as well as the method of producing them, are features of the invention. These novel substances include bisnorallocholan-22-al-11-one with a substituent at C-3, which more specifically may be a hydroxy or an acyloxy group, such as an acetoxy, propionoxy, butyroxy or benzyloxy radical; also, $\Delta^{20(22)}$-bisnorallocholene-3,22-diol-11-one-3,22-diacylate, in which the acyloxy substituent may be a benzoyloxy or an alkanoyloxy radical, such as an acetoxy, propionoxy or butyroxy radical.

The following specific examples of processes embodying the invention are given by way of further illustration and not of limitation.

EXAMPLE 1

Stage 1

A solution of 13.70 g. of $\Delta^{22}$-ergostene-3-ol-11-one-3-acetate in 600 ml. of methylene chloride in a one-liter Morton flask is cooled in a Dry Ice-acetone bath to about $-60°$ C. Ozonized oxygen is passed through the solution at the rate of 0.98 mole per minute for forty-two minutes. The solution is allowed to warm to room temperature and is then transferred to a one-liter round-bottom flask, equipped with a modified Claisen distilling head and a capillary tube, and distilled under nitrogen to give ergostane-3-ol-11-one-22,23-ozonide-3-acetate.

One hundred milliliters of acid are added to the ozonide and the methylene chloride removed under reduced pressure below 30° C. An additional 100 ml. of acetic acid are added and the ozonide decomposed by the addition of zinc dust over a period of twenty minutes, the temperature being maintained between 15° C. and 20° C. The mixture is stirred for an additional thirty minutes, filtered, and the zinc dust washed with 50 ml. of acetic acid. The acetic acid solution is diluted with 50 ml. of water and extracted with two 300 ml. portions of ether. The ether extracts are combined and washed with water until the washings are neutral. The ether solution is then washed with two 250 ml. portions of 1 N sodium hydroxide solution to remove acidic products formed during the ozonization. The ether solution is washed again with water, dried over magnesium sulfate, filtered and ether distilled in vacuo. The crude crystalline product thus obtained is digested with 100 ml. of petroleum ether, cooled and filtered to yield bisnorallocholan-22-al-3-ol-11-one-3-acetate melting at 131–137° C.

*Stage 2*

A solution of 9.72 g. of said bisnorallocholan-22-al-3-ol-11-one-3-acetate in 200 ml. of acetic anhydride and 3 g. of anhydrous sodium acetate is heated under reflux for six hours. The acetic anhydride is then removed by distillation under reduced pressure. The crude residue is digested with 50 ml. of 80% aqueous MeOH, cooled, filtered and dried. The $\Delta^{20(22)}$-bisnorallocholene-3,22-diol-11-one-3,22-diacetate obtained in this way is purified by recrystallization from methanol to give substantially pure material; M. P. 164–166° C.

*Stage 3*

A solution of 5.65 g. of said $\Delta^{20(22)}$-bisnorallocholene-3,22-diol-11-one-3,22-diacetate in 400 ml. of methylene chloride is cooled in a Dry Ice-acetone bath to about −60° C., and ozonized oxygen is passed through the solution at the rate of 0.93 mole per minute for sixteen minutes. After warming to room temperature, 80 ml. of acetic acid is added and the methylene chloride removed in vacuo below 30° C. to give bisnorallocholane-3,22-diol-11-one-20,22-ozonide-3,22-diacetate.

The acetic acid solution of this ozonide is transferred to a three necked round-bottom flask equipped with a stirrer and thermometer, with an additional 20 ml. of acetic acid. The ozonide is decomposed by adding 7 g. of zinc dust over a period of twenty minutes while maintaining the temperature between 15° C. and 20° C. The mixture is then stirred for an additional thirty minutes, filtered and the zinc dust washed with 20 ml. of acetic acid. The filtrate is diluted with 500 ml. of ether, and the ether extract washed successively with water, 1 N sodium hydroxide solution and water. After drying the ether solution over magnesium sulfate and filtering the ether is distilled off to obtain a viscous oil which partially crystallizes. The product is twice recrystallized from hot methanol to give allopregnane-3-ol-11,20-dione-3-acetate; M. P. 131–132° C.; this material forms a yellow 2,4-dinitrophenyl hydrazone melting at 238–239° C.

EXAMPLE 2

*Stage 1*

A solution of 13.7 g. of $\Delta^{22}$-ergostene-3-ol-11-one-3-acetate in 250 ml. of glacial acetic acid is cooled to 20° C. Ozone is passed through the solution at the rate of 1.2 moles per minute for thirty minutes, forming the ozonide ergostane-3-ol-11-one-22,23-ozonide-3-acetate. The solution of the ozonide is cooled to 15° C. and 20.0 g. of zinc dust added in small portions, the temperature being maintained between 15° C. and 24° C. The mixture is stirred for an additional hour, the zinc dust removed by filtration, and the filtrate poured into 500 ml. of ice water. The resulting precipitate is filtered and dried in a vacuum oven at about 65° C. overnight.

The dry crude product thus obtained is dissolved in ether, the ether solution washed with ice cold 1 N sodium hydroxide solution and saturated sodium chloride solution. The ether solution is then dried over magnesium sulfate, filtered, and the ester distilled in vacuo to yield the aldehyde as a viscous oil which crystallizes on standing. The product is chromatographed on 160 g. of acid-washed alumina. Residues from 1:3 petroleum ether-benzene and benzene eluates are combined and recrystallized from n-hexane to give essentially pure bisnorallocholan-22-al-3-ol-11-one-3-acetate; M. P. 130–133° C.

*Stages 2, 3 and 4*

These stages may be carried out as described in Example 1.

While a preferred form of the invention and a number of variations thereof have been disclosed, other modifications may be made without departing from the spirit and scope thereof as defined in the claims.

I claim:

1. The process which comprises ozonizing a $\Delta^{22}$-cyclopentanopolyhydrophenanthrene-11-one compound having a sterol side chain, hydrolyzing the resulting ozonide under reducing conditions thereby producing the corresponding bisnorallocholan-22-al-11-one compound, acylating the C–22 aldehyde group of the latter compound with an acylating agent in the presence of an alkali metal salt having the same acid radical as said acylating agent and acting as a catalyst, thereby forming the corresponding $\Delta^{20(22)}$-bisnorallocholene-11-one-22-ol 22-acylate, ozonizing said acylate, and hydrolyzing the resulting ozonide under reducing conditions, thereby forming the corresponding allopregnane-11,20-dione compound.

2. The process which comprises ozonizing a $\Delta^{22}$-ergostene-11-one compound, hydrolyzing the resulting ozonide under reducing conditions thereby producing a bisnorallocholan-22-al-11-one compound, enol acylating the latter compound with an anhydride of a lower alkanoic acid in the presence of an alkali metal salt of said acid acting as a catalyst, thereby producing a $\Delta^{20(22)}$-bisnorallocholene - 11 - one - 22-ol-22-acylate compound, ozonizing the latter compound and hydrolyzing the resulting ozonide under reducing conditions thereby forming the corresponding allopregnane-11,20-dione compound.

3. The process which comprises ozonizing a $\Delta^{22}$-stigmastene-11-one compound, hydrolyzing the resulting ozonide under reducing conditions thereby producing a bisnorallocholan-22-al-11-one compound, enol acylating the latter compound with an anhydride of a lower alkanoic acid in the presence of an alkali metal salt of said acid acting as a catalyst, thereby producing a $\Delta^{20(22)}$-bisnorallocholene-11-one-22 - ol - 22 - acylate compound, ozonizing the latter compound and hydrolyzing the resulting ozonide under reducing conditions thereby forming the corresponding allopregnane-11,20-dione compound.

4. The process which comprises ozonizing a $\Delta^{22}$-ergostene-3-ol-11-one-3-acylate compound, hydrolyzing the resulting ozonide under reduced conditions thereby producing the corresponding bisnorallocholan-3-ol-11-one-22-al-3-acylate compound, enol acylating the latter compound with an anhydride of a lower alkanoic acid in the presence of an alkali metal salt of said acid acting as a catalyst, thereby producing the corresponding $\Delta^{20(22)}$-bisnorallocholene-3,22-diol-11-one - 3,22 - diacylate compound, ozonizing the latter compound, and hydrolyzing the resulting ozonide under reducing conditions, thereby forming the corresponding allopregnane-3-ol-11,20-dione-3-acylate compound.

5. The process which comprises reacting $\Delta^{22}$-ergostene-3-ol-11-one-3-acetate with ozone to form ergostene-3-ol-11-one-3-acetate-22,23-ozonide, reacting said ozonide with a hydrolyzing agent under reducing conditions thereby providing bisnorallocholane-3-ol-11-one-22-al-3-acetate, reacting the latter compound with acetic anhydride in the presence of sodium acetate catalyst, thereby forming $\Delta^{20(22)}$-bisnorallocholene-3,22-diol-11-one-3,22-diacetate, reacting the latter compound with ozone to produce bisnorallocholan-3,22-diol-11-one-3,22-diacetate-20,22, ozonide, and reacting said ozonide with a hydrolyzing agent under reducing conditions, thereby forming allopregnane-3-ol-11,20-dione-3-acetate.

6. The process which comprises reacting a 22,23-ozonide of a $\Delta^{22}$-cyclopentanopolyhydrophenanthrene-11-one compound having a sterol side chain with a hydrolyzing agent under reducing conditions to form the corresponding cyclopentanopolyhydrophenanthrene-11-one-22-al compound.

7. The process which comprises reacting an ergostane-11-one-22,23-ozonide compound with a hydrolyzing agent under reducing conditions to form the corresponding bisnorallocholan-22-al-11-one compound.

8. The process which comprises reacting a stigmastane-11-one-22,23-ozonide compound with a hydrolyzing agent under reducing conditions to form the corresponding bisnorallocholan-22-al-11-one compound.

9. The process which comprises reacting ergostane-3-ol-11-one-3-acetate-22,23-ozonide with a hydrolyzing agent under reducing conditions to produce bisnorallocholan-3-ol-11-one-22-al-3-acetate.

10. The process which comprises enol acylation of the C-22 aldehyde group of a bisnorallocholan-22-al-11-one compound with an acylating agent in the presence of an alkali metal salt having the same acid radical as said acylating agent and acting as a catalyst, thereby forming the corresponding $\Delta^{20(22)}$-bisnorallocholene-11-one-22-ol 22-acylate, ozonizing said acylate, and hydrolyzing the resulting ozonide under reducing conditions, thereby forming the corresponding allopregnane-11,20-dione compound.

11. The process which comprises enol acylation of the C-22 aldehyde group of a bisnorallocholan-22-al-11-one compound with an anhydride of a lower alkanoic acid in the presence of an alkali metal salt of said acid acting as a catalyst, thereby forming the corresponding $\Delta^{20(22)}$-bisnorallocholene-11-one-22-ol 22-acylate, ozonizing said acylate, and hydrolyzing the resulting ozonide under reducing conditions, thereby forming the corresponding allopregnane-11,20-dione compound.

12. The process which comprises enol acylation of the C-22 aldehyde group of a bisnorallocholan-22-al-11-one compound with acetic anhydride in the presence of an alkali metal acetate acting as a catalyst, thereby forming the corresponding $\Delta^{20(22)}$-bisnorallocholan-11-one-22-ol 22-acetate, ozonizing said acetate, and hydrolyzing the resulting ozonide under reducing conditions, thereby forming the corresponding allopregnane-11,20-dione compound.

13. The process which comprises enol acylation of the C-22 aldehyde group of a bisnorallocholan-3-ol-11-one-22-al compound with an acylating agent in the presence of an alkali metal salt having the same acid radical as the reagent and acting as a catalyst, thereby forming the corresponding $\Delta^{20(22)}$-bisnorallocholan1-3,22-diol-11-one 3,22-diacylate, ozonizing said acylate, and hydrolyzing the resulting ozonide under reducing conditions, thereby forming the corresponding allopregnane-3-ol-11,20-dione 3-acylate compound.

14. The process which comprises reacting a bisnorallocholan-22-al-11-one compound with an acylating agent in the presence of an alkali metal salt catalyst having the same acid radical as said acylating agent, thereby forming the corresponding $\Delta^{20(22)}$-bisnorallocholene-11-one-22-ol 22-acylate compound.

15. The process which comprises reacting a bisnorallocholan-22-al-11-one compound with an anhydride of a lower alkanoic acid in the presence of an alkali metal salt of said acid acting as a catalyst, thereby producing the corresponding $\Delta^{20(22)}$-bisnorallocholan-11-one-22-ol 22-alkanoate compound.

16. The process which comprises reacting bisnorallocholan-3-ol-11-one-22-al-3-acetate with acetic anhydride in the presence of sodium acetate catalyst, thereby forming $\Delta^{20(22)}$-bisnorallocholene-3,22-diol-11-one-3,22-diacetate.

17. The process which comprises reacting a $\Delta^{20(22)}$-bisnorallocholene-11-one-22-ol 22-acylate compound with ozone to form the corresponding $\Delta^{20(22)}$-bisnorallocholan-11-one-22-ol 22-acylate compound.

18. The process which comprises reacting a $\Delta^{20(22)}$-bisnorallocholene-11-one-22-ol-22-acylate compound with ozone to produce the corresponding bisnorallocholane-11-one-22-ol-22-acylate-20,22-ozonide compound.

19. The process which comprises reacting $\Delta^{20(22)}$-bisnorallocholene-3,22-diol-11-one-3,22-diacetate with ozone to produce bisnorallocholan-3,22-diol-11-one-3,22-diacetate-20,22-ozonide.

20. The process which comprises reacting a $\Delta^{20(22)}$-bisnorallocholan-11-one-22-ol 22-acylate with a hydrolyzing agent under reducing conditions to produce the corresponding allopregnane-11,20-dione compound.

21. The process which comprises reacting a bisnorallocholan-11-one-22-ol-22-acylate-20,22-ozonide with a hydrolyzing agent under reducing conditions to produce the corresponding allopregnane-11,20-dione compound.

22. The process which comprises reacting bisnorallocholan-3,22-diol-11-one-3,22 - diacetate - 20,22 - ozonide with a hydrolyzing agent under reducing conditions to produce allopregnane-3-ol-11,20-dione-3-acetate.

23. Bisnorallocholan-3-ol-11-one-22-al - 3-(lower alkanoate).

24. Bisnorallocholan-3-ol-11-one-22-al-3-acetate.

25. Bisnorallocholan-3-ol-11-one-22-al.

26. $\Delta^{20(22)}$-Bisnorallocholene-11-one-22 - ol - 22-(lower alkanoate).

27. $\Delta^{20(22)}$-Bisnorallocholene-3,22-diol-11-one-3,22-bis-(lower alkanoate).

28. $\Delta^{20(22)}$-Bisnorallocholene - 3,22-diol-11-one-3,22-diacetate.

29. Bisnorallocholan-3,22-diol-11-one - 3,22 - bis(lower alkanoate)-20,22-ozonide.

30. Bisnorallocholan - 3,22 - diol - 11 - one - 3,22 - diacetate-20,22-ozonide.

References Cited in the file of this patent

UNITED STATES PATENTS 2,588,396  Levin _____ Mar. 11, 1952

OTHER REFERENCES

Chamberlin: J. A. C. S., 73, 2396–97 (1951).